Jan. 13, 1953   H. B. HATFIELD, JR   2,625,268
WATER TRAP FOR GASOLINE TANKS
Filed June 1, 1950
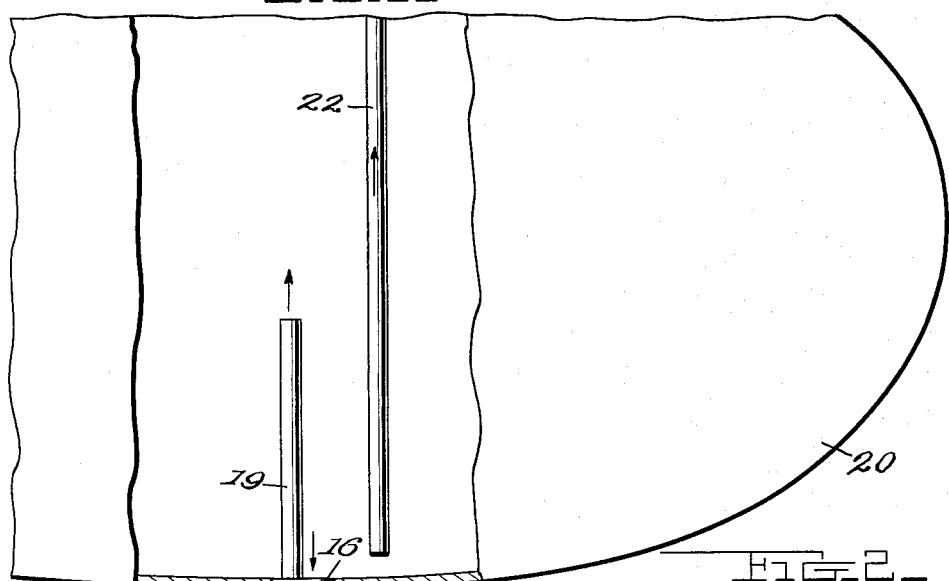
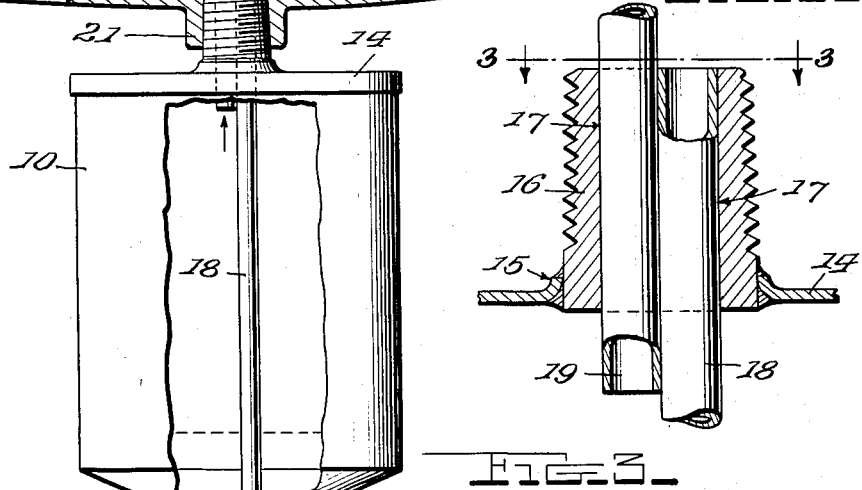
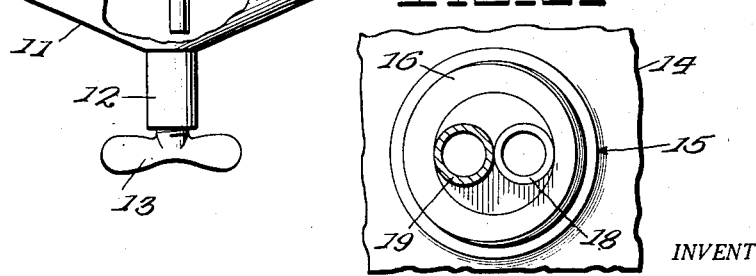
INVENTOR.
Harold B. Hatfield, Jr.
BY
atty.

Patented Jan. 13, 1953

2,625,268

UNITED STATES PATENT OFFICE 2,625,268

WATER TRAP FOR GASOLINE TANKS

Harold Burgess Hatfield, Jr., Byrn Mawr, Pa.

Application June 1, 1950, Serial No. 165,519

2 Claims. (Cl. 210—57)

This invention relates to water traps for gasoline tanks and has special reference to a water trap for use in connection with the gasoline tank of an automobile.

The gasoline used in operating automobiles is apt to contain a certain amount of water which, because of its specific gravity being greater than pure gasoline, will tend to accumulate in the bottom of the automobile gasoline tank. Since it is desirable to use the full capacity of the tank, the pipe leading from the tank to the fuel pump of the engine is usually arranged so that its intake end is quite close to the bottom of the tank. When water accumulates this intake end will at times, even while the automobile is at rest, extend below the surface of the water. Further, while the automobile is in motion the churning of the water and gasoline may cause water to enter the intake end of the pipe.

To overcome these faults one important object of this invention is to remove from the body of the tank any water which may accumulate therein.

A further object of the invention is the provision of means by which any water carried into the tank will be automatically drawn off as fast as it accumulates.

Another object of the invention is to provide for such automatic removal of water without the employment of a pump or other means having moving mechanisms.

A still further object of the invention is to provide a novel means for the purpose set forth whereby the removal of water from the trap may be effected with practically no accompanying loss of gasoline.

It is a further object of the invention to provide a water trap for gasoline tanks wherein means are provided for the return to the main tank of any gasoline in the trap as the volume of the collected water in the tank increases.

A further object of the invention is to provide a water trap for gasoline tanks which may be attached by means of the standardized threaded aperture in the bottom of the tank, without any modifications of the tank being required.

A more specific object of the invention is to provide a water trap for gasoline tanks which has both a supply and return tube extending through the attachment neck thereof, said return tube extending upwardly into the tank for some distance, thus serving to exhaust entrapped air from the trap to permit entrance of the gasoline and water when the tank is first filled, and further providing for the return of gasoline to the main tank as the heavier, additional water collects in the trap.

With the above and other objects in view, as will be presently apparent, the invention consists in general of certain novel details of construction and combinations of parts hereinafter fully described, illustrated in the accompanying drawings and particularly claimed.

In the drawings, like characters of reference indicate like parts in the several views, and Figure 1 is a view showing a portion of a gasoline tank with the present invention applied thereto;

Figure 2 is an enlarged fragmentary section showing the means for connecting this invention to an automobile gasoline tank; and Figure 3 is a section on the line 3—3 of Figure 2.

In the embodiment of the invention as here disclosed, there is provided a water collecting trap-forming tank having a body 10 preferably of cylindrical form. This body has an inverted frusto-conical bottom 11 from the center of which there projects downwardly a draw off pipe nipple 12 normally closed by a screw plug 13. The body 10 is also provided with a permanently attached cover 14 provided with a central opening 15 wherein is welded the lower end of an externally screw threaded extension plug 16. The plug is provided with a pair of openings 17 being side by side and extending vertically through the plug. Secured in one of the openings 17 is a drain tube or pipe 18 the upper end of which is flush with the top surface of the plug 16. The other end of the tube 18 extends downwardly and terminates within the frusto-conical bottom portion 11 of the trap-forming tank 10. In the remaining opening 17 is fixed a tube or pipe 19 which projects slightly below the bottom of the plug 16 and extends for several inches above the plug.

In applying the invention to a gasoline tank such as is shown in part at 20 the plug 16 is screwed into a nipple 21 depending from the bottom of the tank 20. The nipple 21 may, in some instances, be that which is usually closed by a plug the removal whereof permits draining of the tank. Extending into the tank from the top or upper part is the fuel supply pipe 22 which terminates close to the bottom of the tank. The pipe 22 extends to the pump supplying fuel to the carburetor of the engine mechanism.

With this invention in use, as fast as any water gathers in the bottom of the tank 20 it will run down through the pipe 18 into the collecting tank 10 and will there settle in the bottom part. In filling the tank 20, before the liquid level reaches the top of the tube 19, the tube 19 will serve as an escape for the air forced out of the trap 10 by entrance of the liquid through the tube 18. As soon as the gasoline rises above the top of the pipe 19 it will have, in part, passed down the pipe 18 into the auxiliary or collecting tank 10 so that until water is dejected from the gasoline in tank 20 the auxiliary tank will be filled with gasoline. When, however, water appears and collects in the auxiliary tank part of the gasoline will be forced back into the tank 20 through the pipe 19. Whenever desired, the plug 13 that is similar to a spigot or tap may be partially rotated to drain and draw off accumulated water, and if care be taken, the plug 13 may be tightened before any appreciable passage of gasoline through the draw-off pipe 12 occurs.

While there is herein shown and described the preferred embodiment of the invention, it is nevertheless to be understood that minor changes may be made therein without departing from the spirit and scope of the invention as claimed.

What is claimed is:

1. In a device for the purpose described, an auxiliary tank having a body, a top and a bottom fixed to said body, a screw threaded plug fitted in the top of the tank and projecting upwardly for engagement with a nipple extending downwardly from a gasoline reservoir, a pipe secured in and extending downwardly through said plug and having its upper end flush with the top of said plug and its lower end close to the bottom of the tank, a second pipe secured in and extending upwardly through said plug and having its lower end close to the under surface of the plug and its upper end remote from the upper surface of the plug to extend into said reservoir when the plug is engaged in the nipple extending downwardly from the gasoline reservoir, a nipple extending downwardly from the bottom of said auxiliary tank, and a removable stop plug normally closing said nipple.

2. In combination with a gasoline storage tank, an auxiliary collecting tank attached to the bottom of said storage tank, a first pipe connecting the upper end of said collecting tank with the interior of said storage tank and extending a relatively short distance up into said storage tank, a second pipe connecting the lower end of said collecting tank with said storage tank and having its upper end substantially flush with the upper face of the bottom wall of said storage tank, and draw off means at the bottom of said collecting tank.

HAROLD BURGESS HATFIELD, Jr.

REFERENCES CITED

The following references are of record in the file of this patent:

UNITED STATES PATENTS

| Number | Name | Date |
|---|---|---|
| 1,055,744 | Hans | Mar. 11, 1913 |
| 1,063,754 | Weiss | June 3, 1913 |
| 1,459,934 | Stiles | June 26, 1923 |
| 1,469,947 | Mudd | Oct. 9, 1923 |
| 1,478,189 | Todd | Dec. 18, 1923 |
| 1,749,235 | Stafford et al. | Mar. 4, 1930 |
| 1,792,827 | Farkas | Feb. 17, 1931 |
| 2,208,621 | Ball et al. | July 23, 1940 |
| 2,253,509 | Dort | Aug. 26, 1941 |
| 2,333,315 | Klingberg | Nov. 2, 1943 |
| 2,339,303 | Tillery | Jan. 18, 1944 |

FOREIGN PATENTS

| Number | Country | Date |
|---|---|---|
| 272,974 | Italy | Mar. 26, 1930 |